United States Patent [19]
Dussaulx et al.

[11] Patent Number: 4,990,469
[45] Date of Patent: Feb. 5, 1991

[54] REFRACTORY MATERIAL AND PROCESS FOR PRODUCTION OF THE SAME

[75] Inventors: Michel Dussaulx, Meckenheim/Merl; Francisco Lorenzo, Bornheim/Roisdorf, both of Fed. Rep. of Germany

[73] Assignee: Norton GmbH, Fed. Rep. of Germany

[21] Appl. No.: 234,163

[22] Filed: Aug. 19, 1988

[30] Foreign Application Priority Data

Nov. 23, 1987 [DE] Fed. Rep. of Germany ....... 3739571
Dec. 17, 1987 [DE] Fed. Rep. of Germany ....... 3742862

[51] Int. Cl.$^5$ ............................................. C04B 35/56
[52] U.S. Cl. ......................................... 501/89; 501/92
[58] Field of Search ..................................... 501/89, 92

[56] References Cited

U.S. PATENT DOCUMENTS

| 2,752,258 | 6/1956 | Swentzel | 501/92 |
| 4,800,182 | 1/1989 | Izaki et al. | 501/92 |

FOREIGN PATENT DOCUMENTS

| 809247 | 3/1969 | Canada | 501/92 |
| 921559 | 12/1954 | Fed. Rep. of Germany . | |
| 3343577 | 6/1984 | Fed. Rep. of Germany . | |
| 60-046973 | 3/1985 | Japan | 501/92 |
| 61-101465 | 5/1986 | Japan | 501/92 |

Primary Examiner—Mark L. Bell
Assistant Examiner—David M. Brunsman
Attorney, Agent, or Firm—Wegner, Cantor, Mueller & Player

[57] ABSTRACT

The present invention relates to a refractory material which consists of 63 to 82 weight percent of SiC, 15 to 27 weight percent of $Si_3N_4$ and 3 to 10 weight percent of inorganic oxides.

9 Claims, No Drawings

REFRACTORY MATERIAL AND PROCESS FOR PRODUCTION OF THE SAME

The present invention relates to a new refractory material as well as to a process for production of the same.

From West German application O.S. No. 2,458,268 there are known refractory mixes which contain $Si_3N_4$, SiC, $Al_2O_3$ and binders. The composition consisting of these substances is formed by hot pressing, so that a composite material is obtained.

From West German Patent No. 921,559 there are known refractory mixes of silicon carbide compositions and silicon nitride as binder, the binder containing a zirconium compound.

From European Patent Application No. 153,000 there is known a material which is produced from SiC, $Si_3N_4$ and aluminum oxide. In this process, 4 to 8 weight percent of aluminum powder and 10 to 16 weight percent of silicon powder are used. The mixture is nitrided at approximately 1300° C. As a result, 50 to 80 weight percent of sialon is formed. End products which contain 70% of β-sialon are especially preferred.

From West German O.S. No. 3,343,577 there is known a building material which contains 80 to 90 weight percent of silicon carbide particles, of which 60 weight percent have a particle size of −3.4 to +0.105 mm and the rest a particle size of up to 0.105 mm, and 10 to 20 weight percent of silicon particles with a particle size of up to 0.074 mm. Approximately 1 to 4 weight percent of a volatile binder, 4 to 8 weight percent of water and 0.5 to 10 weight percent of particles of a refractory oxide with a particle size of up to 0.084 mm are added to the base mix, from which compacts are formed by impact pressing and then dried before being fired in a nitrogen atmosphere to form silicon nitride.

The object of the present invention is to provide a refractory material which has improved physical and mechanical properties, and which is not a composite material and contains no sialon.

This object is achieved by a material which consists of 63 to 82 weight percent of SiC, 15 to 27 weight percent of $Si_3N_4$ and 3 to 10 weight percent of inorganic oxides.

The refractory material according to the invention preferably contains 67 to 72 weight percent of SiC and 23 to 25 weight percent of $Si_3N_4$. The proportions of inorganic oxides are, in particular, between 5 and 8 weight percent. The oxides used are preferably iron oxide, aluminum oxide and sodium oxide. It is possible completely or partly to replace iron oxide by zinc oxide, aluminum oxide by titanium oxide and/or zirconium oxide and sodium oxide by calcium, potassium and/or magnesium oxide. Standard plasticizers can be considered as the organic binders. These include, in particular, fats, petroleum jellies (e.g.; vaseline ™) polyvinyl alcohol, tristearin and other organic binders.

The object of the present invention is also a process for production of the refractory material. This process is characterized in that (a) 63 to 82 weight percent of silicon carbide powder, 10 to 36 weight percent of silicon powder and up to 10 weight percent of inorganic oxide powders with a particle size of at most 300 μm are mixed to a stable suspension, (b) subjected to a shaping process, (c) dried and (d) fired at 1380° to 1450° C. in a nitrogen atmosphere.

In the process according to the invention, 70 to 80 weight percent of silicon carbide, 15 to 22 weight percent of silicon powder and up to 8 weight percent of inorganic oxides are preferably used. Especially preferred are 17 to 20 weight percent of silicon powder and 5 weight percent of inorganic oxides. The inorganic oxides can contain up to 2 weight percent of iron oxide, 1 to 6 weight percent of aluminum oxide and up to 0.4 weight percent of sodium oxide. Especially preferred are 0.5 to 1.5 weight percent of iron oxide and up to 0.1 weight percent of sodium oxide. It is possible completely or partly to replace iron oxide by zinc oxide, aluminum oxide by titanium oxide and/or zirconium oxide and sodium oxide by calcium, potassium, magnesium oxide. The particle size of the powders used is preferably in the range of 0.1 to 150 μm. Plasticizers such as fats, petroleum jellies, polyvinyl alcohol and/or tristearin are used as the organic binders. The preferred firing temperature is around 1420° C. The firing step is performed in a nitrogen atmosphere, in order on the one hand to prevent oxidation and on the other hand to nitride the silicon powder.

The refractory materials produced by the process according to the invention have an excellent bending strength and thermal stability. The oxidation resistance is also excellent, due to the very low gas permeability. The properties of a preferred product to the invention are presented in the following table. In this case, the product is a refractory material which contains 70 weight percent of SiC, 25 weight percent of $Si_3N_4$ and 5% of inorganic oxides.

TABLE 1

| | |
|---|---|
| Bulk density | 2.83 g/cm³ |
| Open porosity | 11% |
| Modulus of elasticity | 250 GPa |
| Bending strength (at room temperature) | 190 MPa |
| Bending strength (at 1250° C.) | 180 MPa |
| Bending strength (at 1400° C.) | 180 MPa |
| Gas permeability | $10^{-4}$ |
| Pore size (average) | 1 μm |
| Oxidation resistance | excellent |
| Thermal stability | excellent |

The advantages of the properties of the refractory material of the invention are made clear by the following table, in which the new product according to the present invention is compared with 4 products of the prior art.

TABLE 2

| Property | Product according to the invention | Cryston[1] | Cryston[1] | Cryston[1] | Refrax[2] |
|---|---|---|---|---|---|
| SiC (weight percent) | 70 | 73 | 74 | 70 | 79–88 |
| $Si_3N_4$ (weight percent) | 25 | 24 | 25 | 21 | 18.5–9.5 |
| $SiO_2$ (weight percent) | — | — | — | — | 1.4 |

TABLE 2-continued

| Property | Product according to the invention | Cryston[1] | Cryston[1] | Cryston[1] | Refrax[2] |
|---|---|---|---|---|---|
| Other oxides (weight percent) | 5 | 3 | 1 | 9 | 3.5 |
| Density | 2.83 | 2.78 | 2.35 | 2.73 | 2.60 |
| Porosity (%) | 11 | 11 | 23 | 13 | 15 |
| Young's modulus (GPa) | 250 | 225 | 130 | 220 | 120 |
| Bending strength (MPa) | | | | | |
| 20° C. | 190 | 120 | 80 | 85 | 40–44 |
| 1200° C. | 180 | 170 | 114 | 70 | 47 |
| 1400° C. | 180 | 125 | 69 | 67 | 42 |
| Thermal expansion coefficient $10^{-6} K^{-1}$ 20 to 1400° C. | 4.4 | 5.1 | 4.7 | 5.3 | 4.7 |

[1]Cryston is a trade name for silicon-nitride-bound silicon carbide of NORTON.
[2]Carborundum product According to the above table, the material of the invention has a higher density than do the known products. The porosity is in some cases equal or somewhat lower. Nevertheless, it has been found that the product of the invention has an extremely useful and suitable permeability. This can be explained by the fact that the permeability depends not only on the porosity but also on the pore shape. Therefore a pore shape which results in an improved permeability is achieved by the process according to the invention. The comparison of the values in the above table also shows that the Young's modulus and the values of bending strength of the material according to the invention are considerably better than in the prior art. In this connection it is noteworthy that the bending strength remains almost constant in all temperature ranges up to 1400° C.

In the following, the invention is explained in more detail with reference to the examples:

EXAMPLE 1

Fabrication of a 1500-mm-long beam with 50×50 mm cross section. A ceramic slip was prepared from the following constituents:

| | | | |
|---|---|---|---|
| (a) silicon carbide powder | 0.1 to 10 μm | 37.5% |
| (b) silicon carbide particles | 20 to 150 μm | 40% |
| (c) silicon powder | 0.5 to 50 μm | 17% |
| (d) aluminum oxide | 0.4 to 10 μm | 5% |
| (e) iron oxide | 1 to 75 μm | 0.5% |
| (f) water | | 12.5%* |
| (g) fluidizer such as water and sodium hydroxide | | 0.3%* |

*Relative to the total of a, b, c, d and e.

The slip is cast in a gypsum mold. After removal from the mold, the beam is dried at up to 90° C. and fired at 1420° C. under a nitrogen atmosphere. By the reaction with nitrogen, the density of 2.83 g/cm³ and a bending strength of 200 MPa were obtained.

EXAMPLE 2

Fabrication of a 50×50×4 mm plate with an isostatic press.

A ceramic mix for pressing was prepared from the following constituents:

| | | |
|---|---|---|
| (a) silicon carbide | 0.1 to 150 μm | 73.5% |
| (b) aluminum oxide | 0.4 to 10 μm | 9% |
| (c) iron oxide | 1 to 75 μm | 0.5% |
| (d) silicon powder | 0.5 to 50 μm | 17% |
| (e) dextrin | | 1%* |
| (f) lignosulfonate | | 3%* |
| (g) vaseline ™ | | 1%* |
| (h) water | | 3%* |

*Relative to the total of a, b, c and d.

The mix is prepared in a mixer which is usual for ceramics.

The material is pressed with 1600 bar. After pressing, the plate is dried at 90° C. and fired in a nitrogen atmosphere at 1420° C. By the reaction with nitrogen, a density of 2.70 g/cm³ and a bending strength of 160 MPa at room temperature were obtained.

What is claimed is:

1. A silicon nitride bonded silicon carbide product consisting essentially of 15% to 27% by weight of silicon nitride, 63% to 82% by weight of silicon carbide, from more than 0% to about 2% by weight of iron oxide, and from more than 0% to about 9% by weight of aluminum oxide, said product having a density of at least about 2.7 g/cm³ and a bending strength of at least about 160 MPa, wherein the bonded silicon carbide particles are made up of a coarse fraction and a fine fraction.

2. The silicon nitride bonded silicon carbide product of claim 1, which includes up to about 0.4% by weight of sodium oxide.

3. The silicon nitride bonded silicon carbide product of claim 1, wherein said silicon carbide particles are made up of about 50% by weight of coarse particles and about 50% by weight of fine particles.

4. The silicon nitride bonded silicon carbide product of claim 3, which includes up to about 0.4% by weight of sodium oxide.

5. The silicon nitride bonded silicon carbide product of claim 3, wherein the particle size of the coarse fraction is 20 to 150 microns and the particle size of the fine fraction is 0.1 to 10 microns.

6. The silicon nitride bonded silicon carbide product of claim 5, which includes up to about 0.4% by weight of sodium oxide.

7. The silicon nitride bonded silicon carbide product of claim 1, wherein the bending strength is from about 160 Mpa to about 200 MPa.

8. The silicon nitride bonded silicon carbide product of claim 7, wherein the density is from about 2.7 to about 2.9 g/cm³.

9. The silicon nitride bonded silicon carbide product of claim 1, wherein the amount of the iron oxide is 0.5 to 1.5% by weight.

* * * * *

(12) EX PARTE REEXAMINATION CERTIFICATE (5631st)
United States Patent
Dussaulx et al.

(10) Number: US 4,990,469 C1
(45) Certificate Issued: Dec. 12, 2006

(54) REFRACTORY MATERIAL AND PROCESS FOR PRODUCTION OF THE SAME

(75) Inventors: Michel Dussaulx, Meckenheim/Merl (DE); Francisco Lorenzo, Bornheim/Roisdorf (DE)

(73) Assignee: Saint-Gobain Ceramics and Plastics, Inc., Worcester, MA (US)

Reexamination Request:
No. 90/007,211, Sep. 20, 2004

Reexamination Certificate for:
Patent No.: 4,990,469
Issued: Feb. 5, 1991
Appl. No.: 07/234,163
Filed: Aug. 19, 1988

(30) Foreign Application Priority Data

Nov. 23, 1987 (DE) .............................................. 3739571
Dec. 17, 1987 (DE) .............................................. 3742862

(51) Int. Cl.
*C04B 35/56* (2006.01)

(52) U.S. Cl. ............................................ 501/89; 501/92
(58) Field of Classification Search ....................... None
See application file for complete search history.

(56) References Cited

U.S. PATENT DOCUMENTS 2,752,258 A 6/1956 Swentzel

FOREIGN PATENT DOCUMENTS

GB 2131411 12/1982
JP 61-101465 5/1986

OTHER PUBLICATIONS

Saint–Gobain Ceramics Internet printout "Silicon Nitride Bonded" (no publication date).*
J. Heinrich et al, Influence of Microstructural Variables on Mechanical Properties, Creep and Thermal Shock Behaviour of Reaction Bonded Silicon Nitride, Powder Metallurgy Int., 14:3 (1982), pp. 153–159 (Heinrich I).
J. Heinrich, Berichte der Deutschen Keramischen Gesellschaft, 55:4 (1978), pp. 238–241 (Heinrich II).
White et al, Particle Packing and Particle Shape, J. Am. Cer. Soc., 20(5), 1937, pp. 155–166.

* cited by examiner

*Primary Examiner*—Kiley Stoner

(57) ABSTRACT

The present invention relates to a refractory material which consists of 63 to 82 weight percent of SiC, 15 to 27 weight percent of $Si_3N_4$ and 3 to 10 weight percent of inorganic oxides.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–9, dependent on an amended claim, are determined to be patentable.

New claims 10 and 11 are added and determined to be patentable.

1. A silicon nitride bonded silicon carbide product consisting essentially of 15% to 27% by weight of silicon nitride, 63% to 82% by weight of silicon carbide, from more than 0% to about 2% by weight of iron oxide, and from more than 0% to about 9% by weight of aluminum oxide, said product having a density of at least about 2.7 g/cm$^3$ and a bending strength of at least about 160 MPa *at room temperature*, wherein the bonded silicon carbide particles are made up of a coarse fraction and a fine fraction.

*10. The silicon nitride bonded silicon carbide product of claim 1, wherein the aluminum oxide is present in an amount of 1 to 6 wt.%.*

*11. A slip cast silicon nitride bonded silicon carbide product consisting essentially of 15% to 27% by weight of silicon nitride, 63% to 82% by weight of silicon carbide, from more than 0% to about 2% by weight of iron oxide, and from more than 0% to about 9% by weight of aluminum oxide, said product having a density of at least about 2.7 g/cm$^3$ and a bending strength of at least about 160 MPa at room temperature, wherein the bonded silicon carbide particles are made up of a coarse fraction and a fine fraction.*

\* \* \* \* \*